United States Patent [19]

Hohmann et al.

[11] 3,851,262

[45] Nov. 26, 1974

[54] IMPROVED CONTROL CIRCUITRY HAVING REDUCED JITTER, ESPECIALLY FOR OSCILLOSCOPES

[75] Inventors: Hans-Gunter Hohmann, Holzgerlingen; Frank Rochlitzer, Sindelfingen, both of Germany

[73] Assignee: Hewlett-Packard GmbH, Boblingen, Germany

[22] Filed: May 3, 1973

[21] Appl. No.: 356,872

[30] Foreign Application Priority Data

May 16, 1972 Germany ........................... 2223672

[52] U.S. Cl. .................. 328/185, 307/228, 328/39, 328/181

[51] Int. Cl. .......................... H03k 4/10, H03k 4/86

[58] Field of Search ...... 307/228, 273, 39; 328/181, 328/185, 207

[56] References Cited

UNITED STATES PATENTS

| | | | |
|---|---|---|---|
| 3,350,576 | 10/1967 | Zimmermann | 307/273 |
| 3,358,159 | 12/1967 | Smith | 307/228 |
| 3,439,282 | 4/1969 | Moriyasu | 328/185 |
| 3,571,755 | 3/1971 | Ejiri | 328/185 |
| 3,699,458 | 10/1972 | Martin | 328/181 |
| 3,718,825 | 2/1973 | Matsuoka | 328/185 |
| 3,725,792 | 4/1973 | Kellogg | 307/228 |

*Primary Examiner*—Stanley D. Miller, Jr.
*Attorney, Agent, or Firm*—A. C. Smith

[57] ABSTRACT

A circuitry, preferably to be included in an oscilloscope for repeatedly initiating a function generator by means of signals which are derived in precise time relation to periodic input signals. Trigger impulses are derived at a predetermined level of the periodic input signal and are applied through a divider which has an integer division ratio to the function generator.

4 Claims, 16 Drawing Figures

IMPROVED CONTROL CIRCUITRY HAVING REDUCED JITTER, ESPECIALLY FOR OSCILLOSCOPES

BACKGROUND OF THE INVENTION

For many applications, especially in oscilloscopes it is important that periodic sequences of signals initiate a process or a function in a circuitry when a highly constant time interval has elapsed after the periodic input signals reached a predetermined level. Said time interval is due to the inevitable transient times of the switching elements initiating the function or process. After the initiated process is terminated, the circuitry is returned into its start condition and is released for repeatedly initiating the desired function.

The initiating impulses derived from the sequence of signals have a certain width and the releasing signal has a certain slope of its edges. If the initiating impulse coincides with the edge of the releasing signal, there is no constant time relation between the appearance of the initiating impulse and the actual release of the desired action with the prior art circuitries. This will in the case of oscilloscopes have the undesired result that the initiating impulse for the ramp function which defines the horizontal deflection is displaced as to time by a part of the transient time of the release impulse and the display of the oscilloscope will jitter.

In order to decrease the probability that parts of the initiating impulses and parts of the releasing impulses will over-lap as to time and will lead to undesired time delays, heretofore circuitries for small initiating impulses and steep releasing impulses have been used and have caused remarkable expenses. Furthermore, there has been provided a manually operatable switch for modifying the width of the hold-off impulses. Generally, these hold-off impulses serve to prevent a repeated triggering of the ramp generator until said generator has returned into its start condition. This switch occupies space on the front panel and has to be adjusted in a careful and time consuming manner when the frequency of the input signals is changed.

SUMMARY OF THE INVENTION

The above stated problem can be solved according to one embodiment of the invention, in which a divider circuit is connected between the trigger circuit and the function generator and has an integer division ratio. One input of the divider circuit is connected to the inhibiting circuit and receives an inhibiting signal until the inhibiting circuit and thus the function generator has returned into the start condition. The divider circuit supplies an initiating signal to the function generator after the receipt of a releasing signal from the inhibiting circuit and upon the receipt of a number of input impulses which number corresponds to its division ratio. In this embodiment, the time delay is an integer multiple of the repetition rate of the trigger impulses, where according to the dividing ratio of *n*-to-one, at least one of the input impulses at the input of the divider circuitry prepares the delivery of a signal which actually initiates the function generator. An eventual phase shift of the first preparatory impulse under the influence of the inhibiting circuitry is not critical as this impulse does not directly initiate the function generator. It is only the impulse manner n which initiates the function generator and which can no longer be phase shifted by more or less time coincidence with the inhibiting signal.

DESCRIPTION OF THE PREFERRED EMBODIMENTS

Figure 1:
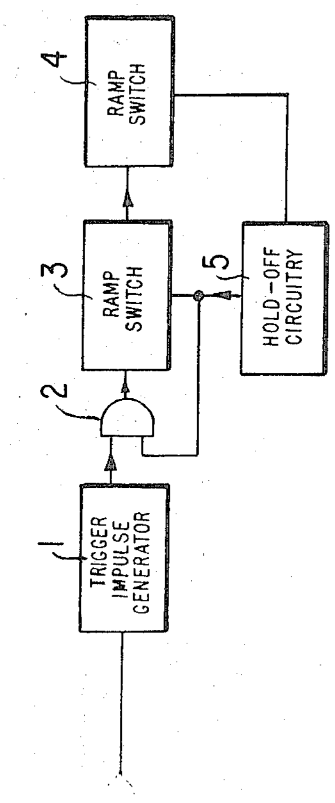
FIG. 1 shows a block diagram of a known trigger circuitry for the horizontal deflection of an oscilloscope.

Referring to FIG. 1, a known circuitry for the horizontal deflection of an oscilloscope contains in series a trigger impulse generator 1, an initiating circuit including a (logical) AND-gate 2, a ramp switch 3 and a ramp generator 4. An input of the AND-gate and an inhibiting input of the ramp switch are connected to the output of a hold-off circuitry 5 which is controlled by the ramp generator. As is not illustrated, the trigger impulse generator 1 may include a Schmitt-trigger and an impulse former and the ramp generator may include a capacitor fed by a constant current source.

Figure 2:
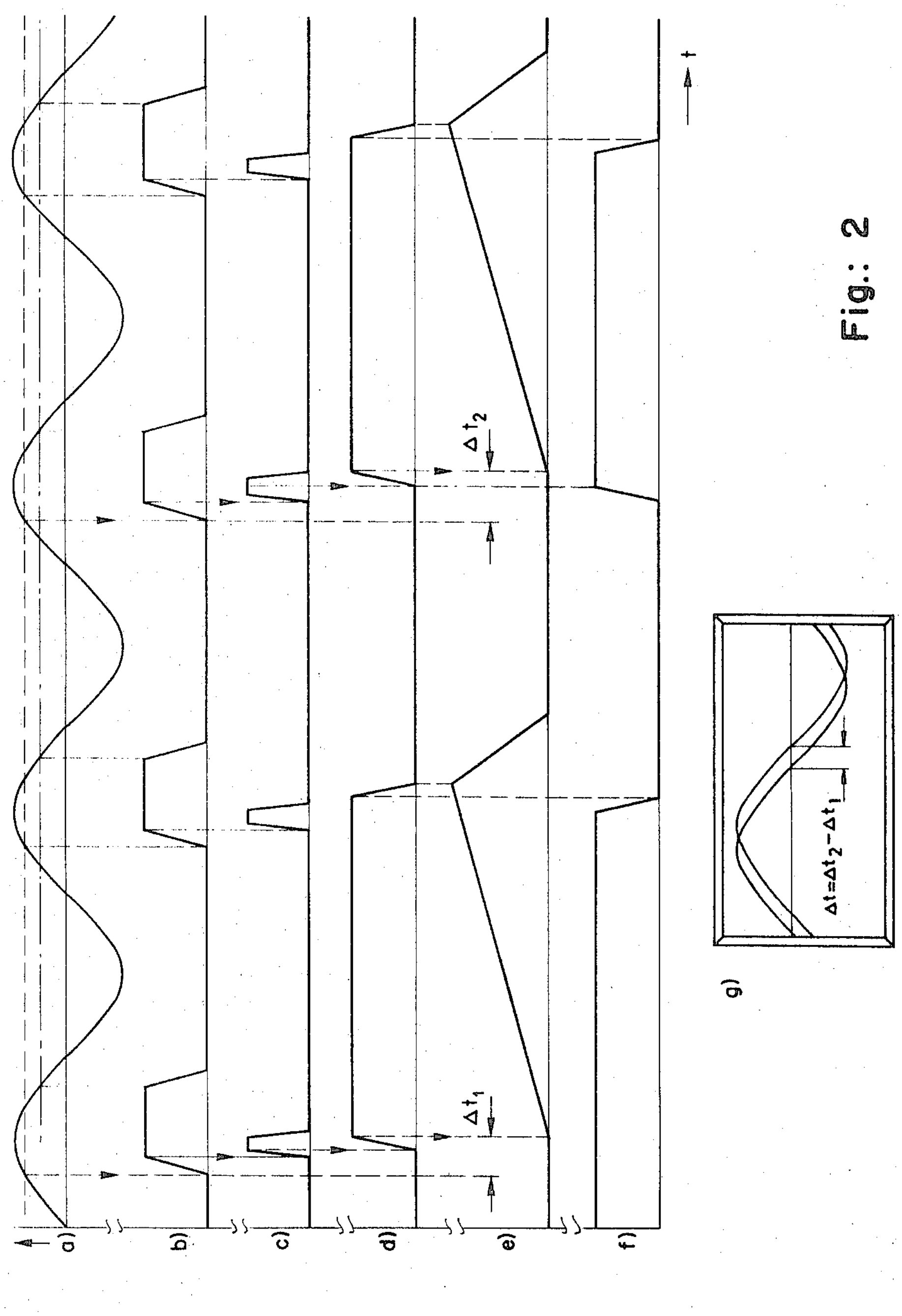
FIGS. 2*a–g* show time diagrams of the signals appearing in the trigger circuitry according to FIG. 1.

For the purpose of explaining the object of the invention, the function of this circuitry is illustrated in FIGS. 2*a–g* for a periodic input signal: Each time the sine wave input signal according to FIG. 2*a* reaches a predetermined signal level, the Schmitt-trigger in the trigger impulse generator is actuated and supplies an impulse, the trailing edge thereof is initiated, when the input signal drops again to a predetermined signal level (FIG. 2*b*). By a not illustrated impulse former, which may also form a part of the trigger impulse generator, a steep impulse of a preferably short duration is derived from the output signal of the Schmitt-trigger (FIG. 2*c*). The trailing edge of said steep impulse actuates the ramp switch 3 which delivers an enabling signal to the ramp generator 4 and determines thereby the initiating point of time of the ramp voltage (FIG. 2*d*, *e*). When the leading edge of the ramp function reaches a predetermined level, the ramp generator is switched by the ramp switch and the ramp function will decrease and the hold-off circuitry 5 will supply an inhibiting signal according to FIG. 2*f* to the AND-gate 2. Thereby the AND-gate and the ramp switch will be inhibited for a sufficient time until the ramp switch has returned into the start condition and may receive a new initiating signal to start a new deflection circle. The transient times of the mentioned impulse circuitry usually add up to a substantially constant total delay $\Delta t1$ between the reaching of the predetermined signal level and the start of the ramp function. If, however, according to the right part of FIG. 2 a trigger impulse with a certain transient time according to FIG. 2*c*, *f* is present at the AND-gate during the trailing edge of the inhibiting signal, the ramp function is no longer initiated at the point of time at which the trigger impulse has just received its full amplitude but at a time when the trailing edge of the inhibiting signal has substantially decreased and the releasing condition has been reached. The thus formed time interval $\Delta t2$ between the reaching of the predetermined signal level of the input signal and the initiation of the ramp function is increased relative to the time interval $\Delta t1$ by an amount of time $\Delta t$ which will result in a phase shifted display of the sequence of input signals on the oscilloscope.

With the prior art trigger circuitries for oscilloscopes the hold-off time has been modified by an external switch such that the trailing edge of the inhibiting signals can no longer coincide as to time with the trigger signals. The known modification of the hold-off time has the disadvantages that it has to be manually adapted according to the frequency of the sequence of signals to be displayed and it is not prevented that several periods of signals are eliminated and thus the brightness of the picture of the oscilloscope is decreased.

Figure 3:
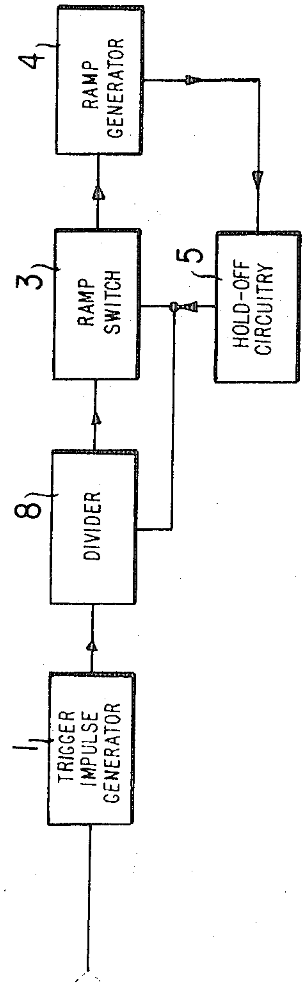
FIG. 3 shows a block diagram of an embodiment of the inventive trigger circuitry for the horizontal deflection of an oscilloscope.

In FIG. 3 an embodiment of the invention is illustrated with a trigger circuitry for an oscilloscope. This circuitry differs from the known circuitry of FIG. 1 in that instead of the AND-gate, a divider circuitry 8 is provided which has a signal input connected to the trigger impulse generator and a clearing input connected to the hold-off circuitry.

Figure 4:
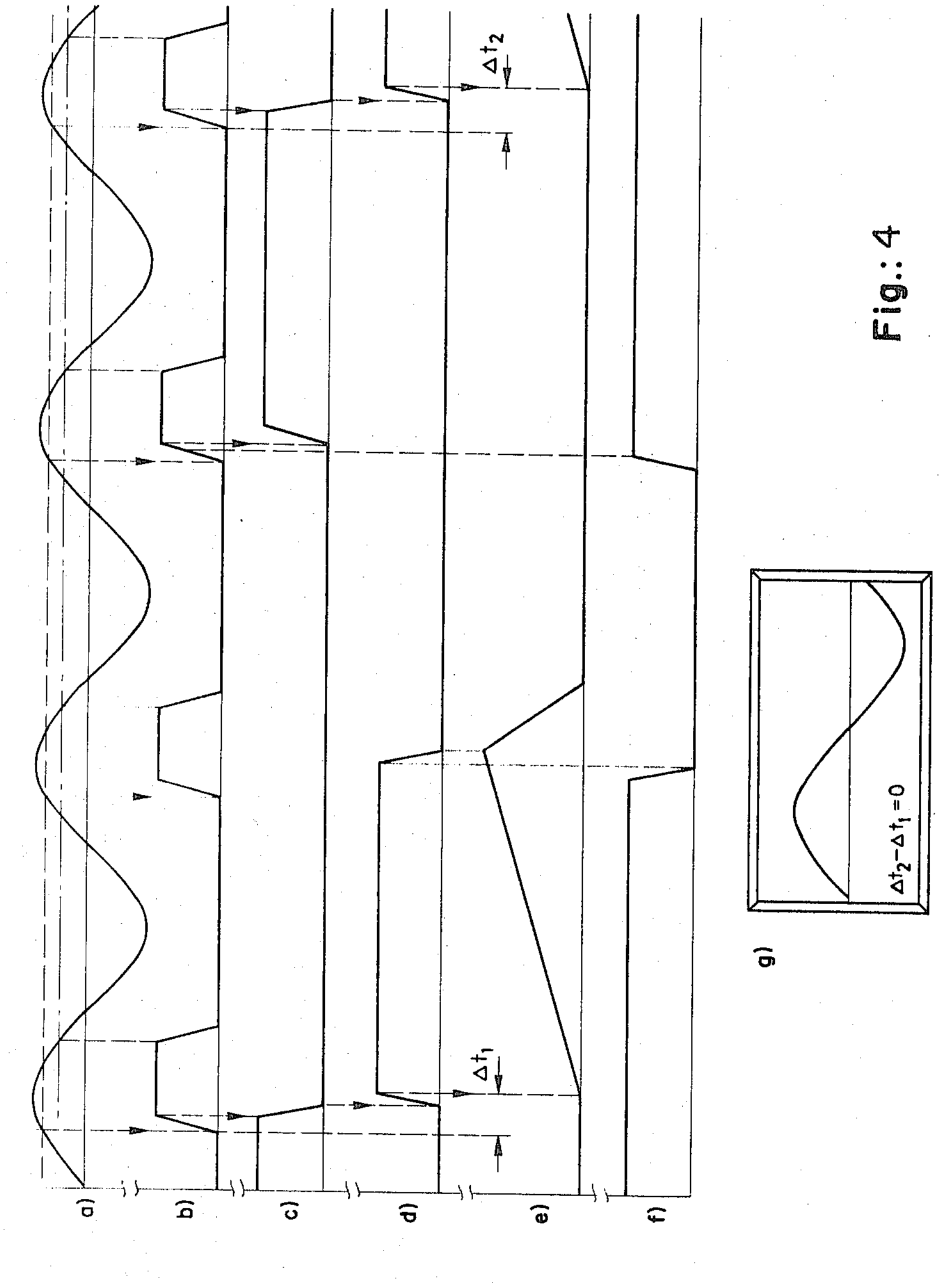
FIGS. 4*a–g* show time diagrams of signal appearing in the circuitry according to FIG. 3.

As long as no inhibiting signal is present at the inhibiting input initiating impulses for the ramp switch will appear at the output of the divider circuitry according to the adjusted integer division ratio and the frequency of such initiating impulses will be smaller than the frequency of the trigger impulses. However, if the divider circuitry 8 will receive an inhibiting signal from the hold-off circuitry 5, no initiating signal from the divider circuitry will be supplied to the ramp switch during the presence of the inhibiting signal. After the inhibiting signal has disappeared, the number of impulses according to the dividing ratio of the divider circuitry has to be supplied to the divider circuitry in order to make said circuitry deliver the initiating impulses. According to FIGS. 4*a–g* the circuitry will operate in the following manner: When the input signal will reach a predetermined signal level (FIG. 4*a*) for the second time, the leading edge of an output signal of the Schmitt-trigger is supplied (FIG. 4*b*) and this output impulse will then cause the divider circuitry to deliver an output impulse, provided the divider circuitry has a division ratio of 1 : 2 (FIG. 4*c*). The duration of the output impulse of the divider circuitry is two periods of the input signal or n periods with a division ratio of $1 : n$. The ramp switch is actuated by the output of the divider circuitry. Finally, the output signal of the ramp switch will initiate the ramp generator with a time delay of $\Delta t1$ relative to the point of time when the input signal reaches the predetermined trigger level (FIG. 4*e*).

The second trigger impulse of the Schmitt-trigger will not initiate an output impulse in the divider circuitry 8, while the third trigger impulse from the Schmitt-trigger will again present the critical case in which a trigger impulse coincides as to time with the trailing edge of the output signal of the hold-off circuitry. As soon as the hold-off circuitry has returned in the releasing condition, the divider circuitry will according to FIG. 4*c*, right part, deliver an impulse edge which corresponds to the trailing edge of a divider impulse and will not initiate the ramp switch, as said switch only responds to trailing edges. However, the divider circuitry is prepared in order to deliver another trailing edge of the impulse upon the fourth trigger impulse so that the ramp switch is actuated. As at this point of time no inhibiting signal is present at the input of the ramp switch, the ramp generator is initiated. According to FIG. 4 the start of the ramp is phase shifted by the time interval $\Delta t2$ relative to the input signals reaching the predetermined signal level, where said time interval is exactly as great as the time interval in the not critical case, in which the transition of the inhibiting signal into the release condition does not coincide with trigger impulses. Because of the exact periodic triggering there will be seen a curve on the screen of the oscilloscope which corresponds to the input function without being disturbed by time shifted triggering.

The circuitry according to this embodiment of the invention is simpler than the circuitry previously described but it has the disadvantage that according to the adjusted division ratio also with not critical trigger impulses always a certain part of the periods of the input signal does not lead to a regeneration of the picture of the oscilloscope so that the brightness is decreased. However, the same disadvantage is also inherent with the manual displacement of the rear edge or of the width, respectively, of the hold-off impulse and the advantage of this embodiment of the invention is that disturbances by time shifted triggering are automatically avoided under any possible time relations of the trigger impulses.

The invention has been illustrated for special trigger circuitries to be used in oscilloscopes. However, it will be evident for the man skilled in the art, that the various components can be modified in different manners and that other components can be added without leaving the scope of the invention as long as preparatory signals are derived from the input signals which correspond to certain logic conditions so that the desired function is initiated with a certain time delay and said time delay is only initiated at points of time which follow each other exactly periodically. This principle is also useful in control—or regulating circuits where periodical signals should repeatedly initiate certain actions or should regenerate them without any time shift. Of course, certain components could be exchanged for such purposes: Instead of a ramp generator another function generator could be used, instead of a monostable multivibrator another preferably adjustable, delay member could be used, instead of an AND-gate another logic circuitry could be used, instead of the hold-off circuit another inhibiting circuitry and instead of the storage means another switching means could be used which only allows a delivery of a trigger signal being delayed by the delay means, to a subsequent circuit, if the trigger signal does not coincide with the inhibiting signal of the inhibiting circuit.

We claim:

1. A trigger circuit for repeatedly initiating a signal function in response to periodic input signals attaining a predetermined level, comprising:

trigger means connected to receive input signals and to produce trigger signals in response to the input signals attaining a predetermined level;

generator means for producing a selected signal function from a predetermined start condition in response to an initiating signal applied thereto;

initiating means including a divider circuit connected between the trigger means and the function generator for applying initiating signals thereto;

inhibiting means connected to the generator means and to the initiating means for supplying thereto inhibiting signals of sufficient duration for preventing delivery of an initiating signal to the generator means until the signal function supplied thereby is in said predetermined start condition;

said divider circuit having a predetermined division ratio and having an input connected to receive trigger signals and an input connected to the inhibiting means, for operating the iniating means to supply an initiating signal to the generator means only upon receipt of a selected number of subsequent signals from said trigger means, said number corresponding to the division ratio of the divider circuit, and said trigger signals being received by the divider circuit in the absence of an inhibiting signal at the divider input from the inhibiting means, said initiating means not delivering an initiating signal during the presence of an inhibiting signal from the inhibiting means at the respective divider input.

2. A trigger circuit as in claim 1 wherein the generator means includes a ramp-signal generator; and the inhibiting means includes a hold-off circuit, which is responsive to the ramp-signal and which supplies said inhibiting signal to the divider circuit substantially during the interval required for said ramp generator to return to said start condition.

3. A trigger circuit as in claim 2 wherein said generator means produces said ramp-signal having a leading rate of change of amplitude with time and a trailing rate of change of amplitude with time; and a ramp switch having a pair of switching states is connected to said generator means for producing the leading edge of the ramp-signal in one of its switching states and for producing the trailing edge of the ramp-signal in the other of its switching states.

4. A trigger circuit as in claim 3, wherein the ramp switch of said initiating means includes a multivibrator connected to receive the output of the divider circuit and has a clearing input connected to receive the output of the hold-off circuit.

* * * * *

UNITED STATES PATENT OFFICE
CERTIFICATE OF CORRECTION

Patent No. 3,851,262 Dated November 26, 1974

Inventor(s) Hans-Gunter Hohmann and Frank Rochlitzer

It is certified that error appears in the above-identified patent and that said Letters Patent are hereby corrected as shown below:

In the title, between "REDUCED" and "JITTER" insert -- TRIGGER --; and

Column 1, line 66, cancel "manner" and substitute -- number --.

Signed and sealed this 4th day of February 1975.

(SEAL)
Attest:

McCOY M. GIBSON JR.
Attesting Officer

C. MARSHALL DANN
Commissioner of Patents